US008297719B2

(12) United States Patent
Tu et al.

(10) Patent No.: US 8,297,719 B2
(45) Date of Patent: Oct. 30, 2012

(54) COMPUTER ENCLOSURE WITH FRAME FOR DISK DRIVE

(75) Inventors: Chen-Ruei Tu, Taipei Hsien (TW);
Li-Ping Chen, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 343 days.

(21) Appl. No.: 12/713,460

(22) Filed: Feb. 26, 2010

(65) Prior Publication Data

US 2011/0095664 A1  Apr. 28, 2011

(30) Foreign Application Priority Data

Oct. 27, 2009  (CN) .......................... 2009 2 0313380

(51) Int. Cl.
*H05K 5/02* (2006.01)

(52) U.S. Cl. .................................... 312/223.2

(58) Field of Classification Search ............. 361/679.02,
361/679.31–679.39, 679.6, 724–727, 679.55;
312/223.2, 223.1, 257.1, 263, 265.5, 265.6
See application file for complete search history.

(56) References Cited

U.S. PATENT DOCUMENTS

| | | | | | |
|---|---|---|---|---|---|
| 1,633,916 | A | * | 6/1927 | Zoufal .............................. | 16/384 |
| 3,149,891 | A | * | 9/1964 | Wilmer .......................... | 312/194 |
| 4,325,597 | A | * | 4/1982 | Morrison ...................... | 312/258 |
| 4,815,796 | A | * | 3/1989 | Rock et al. .................... | 312/263 |
| 5,980,003 | A | * | 11/1999 | Huang ........................ | 312/223.2 |
| 6,059,386 | A | * | 5/2000 | Yu .............................. | 312/223.2 |
| 6,147,862 | A | * | 11/2000 | Ho ........................... | 361/679.32 |
| 6,215,664 | B1 | * | 4/2001 | Hernandez et al. ........... | 361/725 |
| 6,351,376 | B1 | * | 2/2002 | Liang et al. ............. | 361/679.33 |
| 7,218,508 | B2 | * | 5/2007 | Chen et al. ............... | 361/679.57 |
| 7,355,115 | B2 | * | 4/2008 | Liang .............................. | 174/50 |
| 7,448,702 | B2 | * | 11/2008 | Chen et al. ................. | 312/223.2 |
| 2003/0095377 | A1 | * | 5/2003 | Goodman et al. ............. | 361/685 |
| 2008/0247130 | A1 | * | 10/2008 | Chen ............................ | 361/685 |

* cited by examiner

*Primary Examiner* — Janet M Wilkens
(74) *Attorney, Agent, or Firm* — Altis Law Group, Inc.

(57) ABSTRACT

A computer enclosure includes a chassis and a frame. The chassis includes a chassis bottom wall and two chassis sidewalls located on the chassis bottom wall. A positioning post is located on each chassis sidewall. Each chassis sidewall defines a positioning hole. The frame includes a mounting bracket and a retaining bracket integrated with the mounting bracket. The mounting bracket defines a through opening, and includes two mounting bracket sidewalls. Each mounting bracket sidewall defines a slot and a fastening hole. Fasteners are engaged in the positioning holes and the fastening holes, to secure the frame to the chassis. The retaining bracket defines a holding space, configured for receiving a disk drive. The holding space communicates the through opening. When the positioning posts of the chassis are engaged in the slots of the mounting bracket, the positioning holes are aligned with the fastening holes of the mounting bracket.

16 Claims, 4 Drawing Sheets

COMPUTER ENCLOSURE WITH FRAME FOR DISK DRIVE

BACKGROUND

1. Technical Field

The present disclosure relates to a computer enclosure with a frame for receiving a disk drive.

2. Description of Related Art

A disk drive bracket is provided in a computer system to receive disk drives. Presently, a computer chassis and the disk drive bracket are being separately manufactured and must be assembled during the manufacturing process. This takes extra time and adds cost to the computer system. Therefore, a chassis that would overcome the above-mentioned shortcoming is needed.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
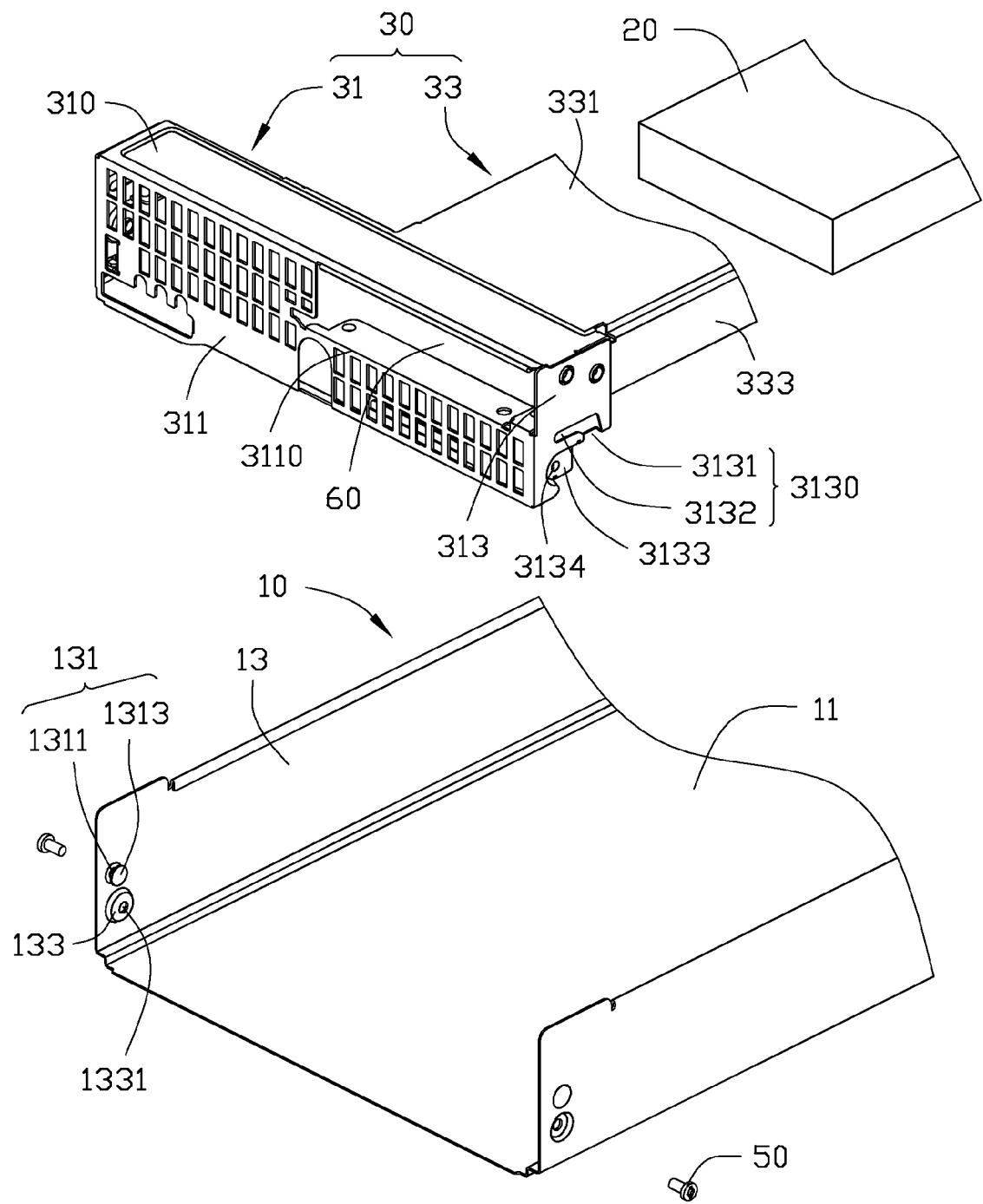
FIG. 1 is an exploded, isometric view of a computer enclosure and a disk drive in accordance with an exemplary embodiment.

Referring to FIG. 1, a computer enclosure in accordance with an exemplary embodiment includes a chassis 10, and a frame 30 for receiving a disk drive 20.

The chassis 10 includes a chassis bottom wall 11 and two chassis sidewall walls 13 located on opposite edges of the chassis bottom wall 11. In one exemplary embodiment, the chassis sidewalls 13 are substantially parallel to each other, and substantially perpendicular to the chassis bottom wall 11. A positioning post 131 and a positioning protrusion 133 below the positioning post 131 are located on an inner surface of each chassis sidewall 13. Each positioning post 131 includes a head 1313 and a neck 1311 connecting the corresponding chassis sidewall 13 and the head 1313. A size of the head 1313 is greater than the size of the neck 1311. A positioning hole 1331 is defined in the positioning protrusion.

The frame 30 includes a mounting bracket 31 and a retaining bracket 33 extending from the mounting bracket 31.

The mounting bracket 31 includes a mounting bracket top wall 310, a mounting bracket front wall 311, and two mounting bracket sidewalls 313. In one exemplary embodiment, the mounting bracket top wall 310, and the mounting bracket sidewalls 313 are substantially perpendicular to the mounting bracket front wall 311, and the mounting bracket sidewalls 313 are substantially parallel to each other. A through opening 3110 is defined in the mounting bracket front wall 311 and configured for receiving the disk drive 20. Each mounting bracket sidewall 313 defines a slot 3131 configured for receiving the positioning post 131 of the chassis 10, and has a recess 3133 below the slot 3131. Each slot 3130 includes an entrance 3131 and a holding portion 3132 communicating with the entrance 3131. The entrance 3131 has an extending direction substantially perpendicular to the mounting bracket top wall 310. The holding portion 3132 has an extending direction substantially parallel to the mounting bracket top wall 310. In one embodiment, the slot 3130 is substantially L-shaped. The entrance 3131 is configured to allow the head 1313 to insert into the slot 3130. The holding portion 3132 is capable of receiving the neck 1311. When the neck 1331 is received in the holding portion 3132, the positioning post 131 cannot be moved away from the holding portion 3132 of each slot 3130 in a direction perpendicular to the mounting bracket front sidewalls 313. A fastening hole 3134 is defined in the recess 3133, corresponding to the positioning hole 1331 of the chassis 10.

Figure 2:
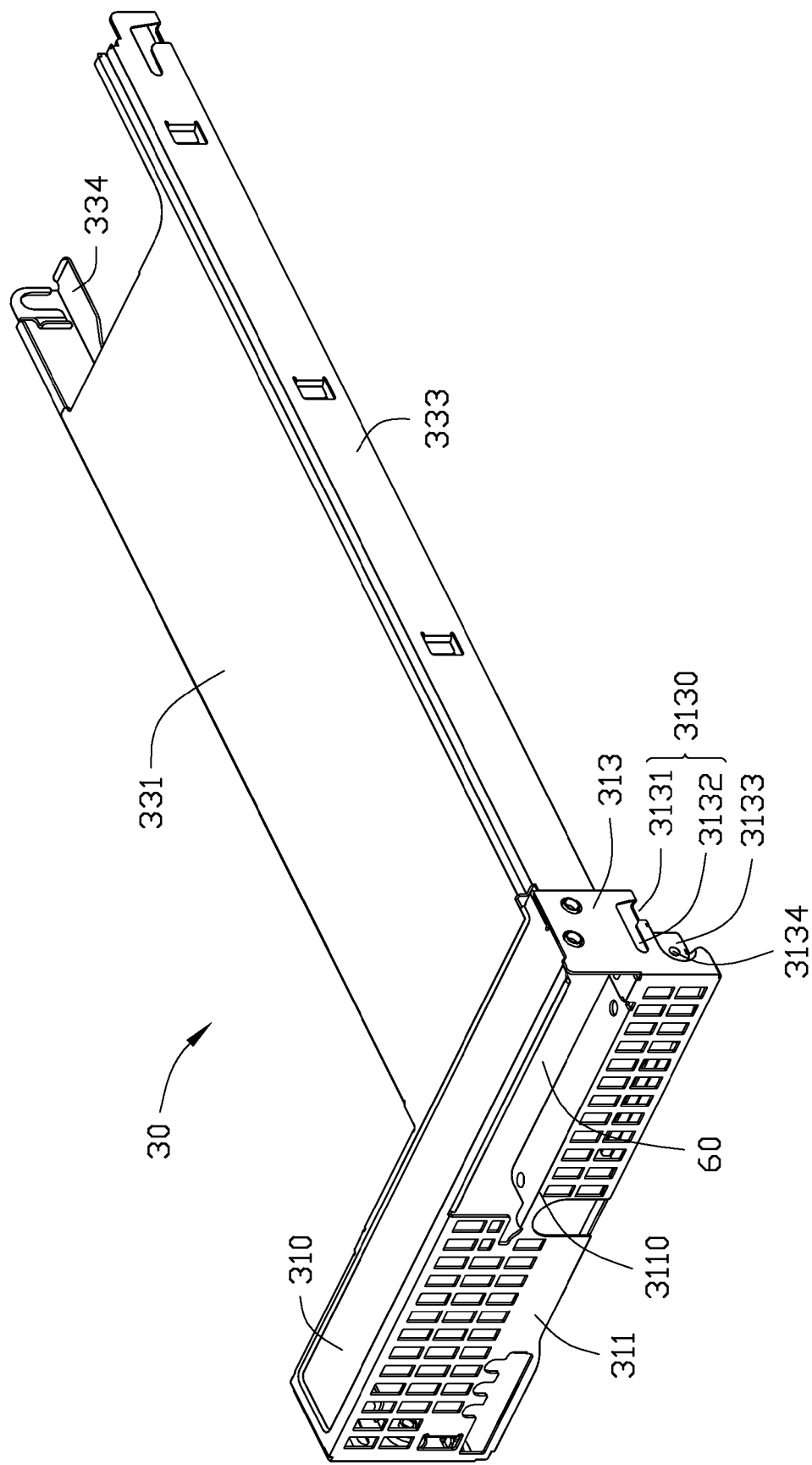
FIG. 2 is an isometric view of a frame of the computer system of FIG. 1.
Figure 3:
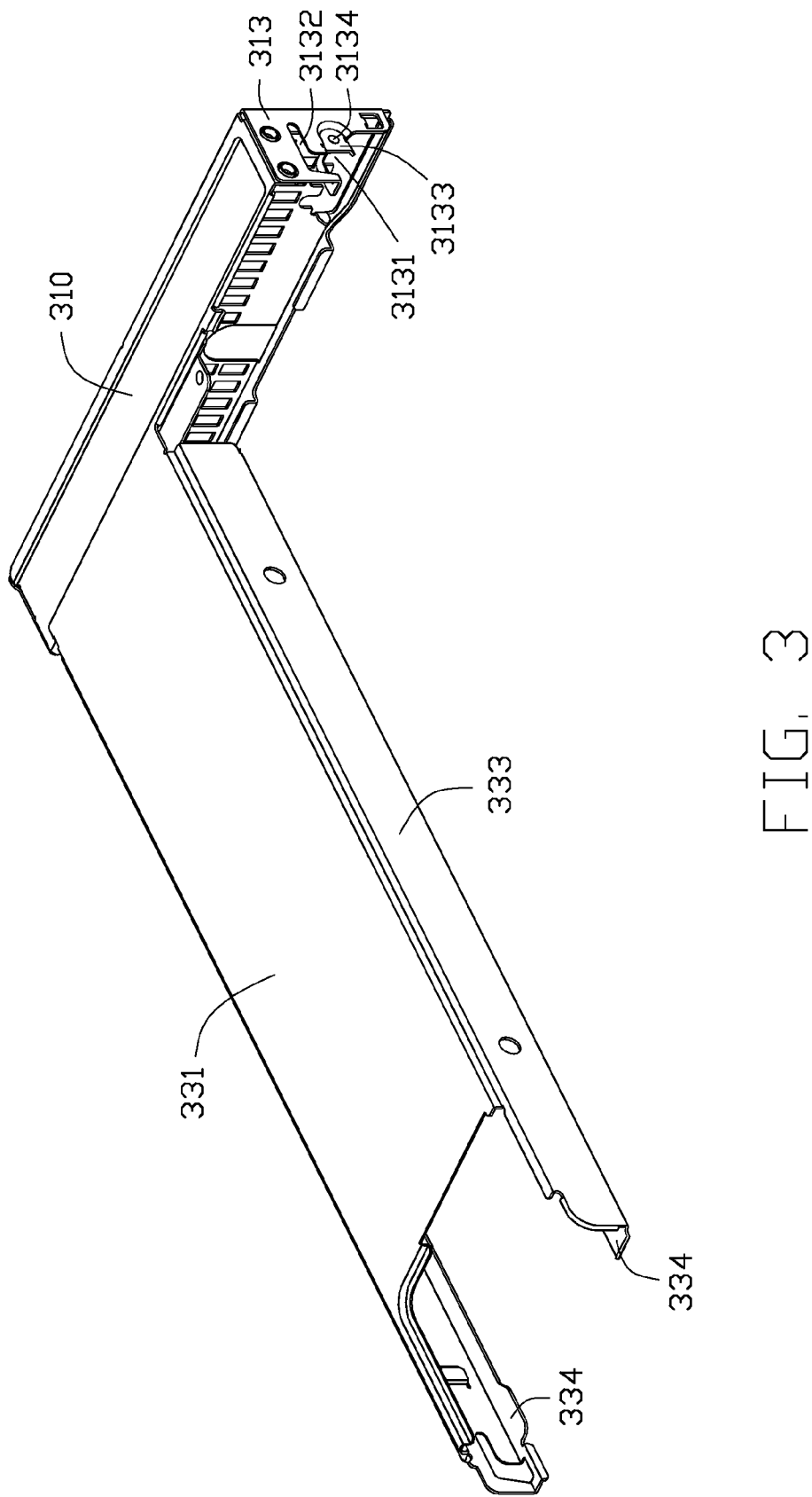
FIG. 3 is similar to FIG. 2, but viewed in a different aspect.

Referring to FIG. 2, the retaining bracket 33 includes a retaining bracket top wall 331, and two retaining bracket sidewalls 333. In one exemplary embodiment, the retaining bracket sidewalls 333 are substantially perpendicular to the retaining bracket top wall 331, the mounting bracket top wall 310, and the mounting bracket front wall 311. The retaining bracket sidewalls 333 are substantially parallel to each other and the mounting bracket sidewalls 313. The retaining bracket top wall 331 extends from the mounting bracket top wall 310. The retaining bracket sidewalls 333 extends downwards from two opposite edges of the retaining bracket top wall 331 and are separated from the mounting bracket sidewalls 313. A flange 334 extends inward from a bottom edge of each retaining bracket sidewall 333, for supporting the disk drive 20. The retaining bracket top wall 331, the retaining bracket sidewall 333 and the flanges 334 together define a holding space 60 configured for receiving the disk drive 20. The holding space 60 is in communication with the through opening 3110 of the mounting bracket 31.

Figure 4:
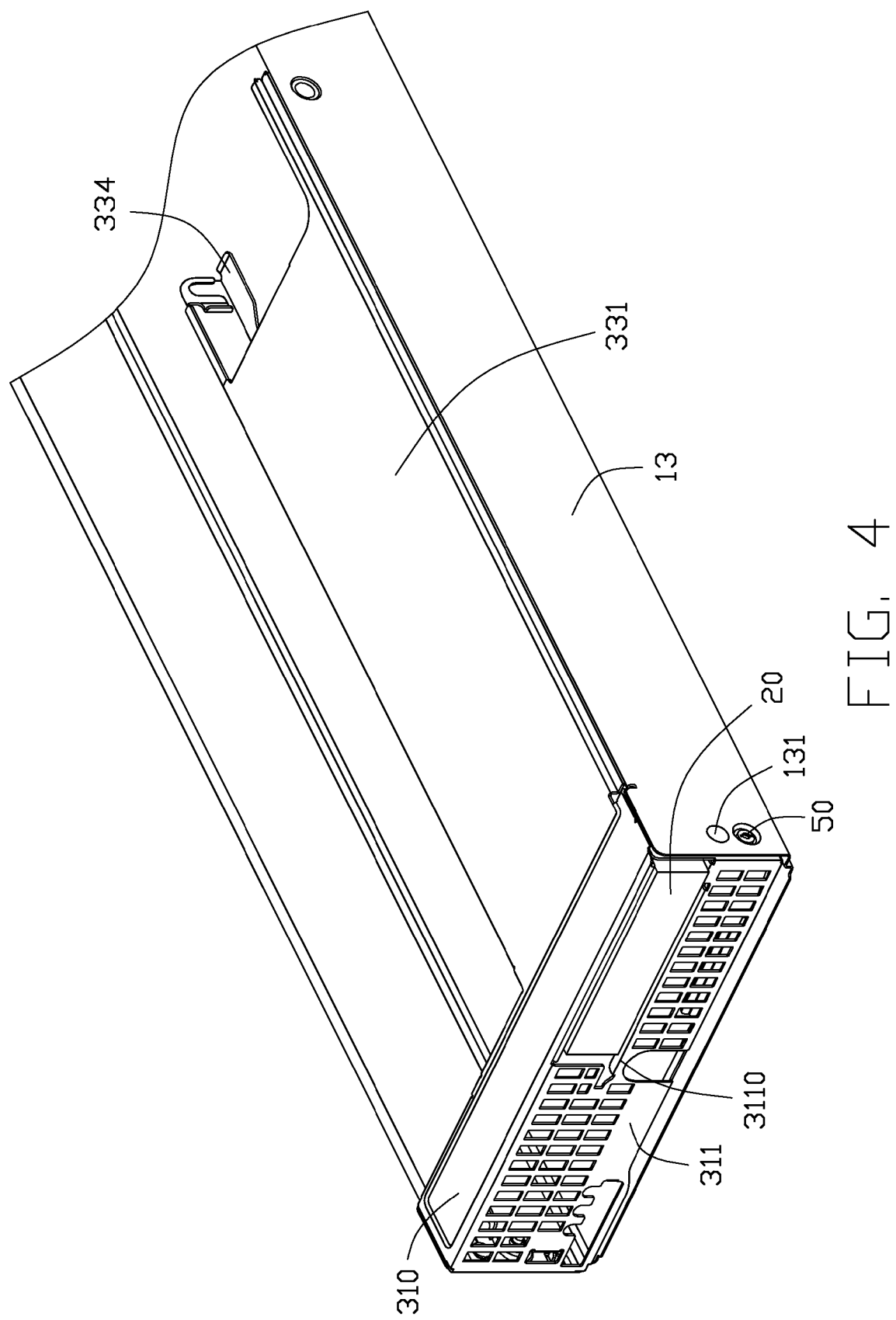
FIG. 4 is an assembled view of the computer enclosure and the disk drive of FIG. 1.

Referring also to FIGS. 1 and 4, in assembly, the frame 30 is placed in the chassis 10 between the chassis sidewalls 13 in a direction, which is substantially perpendicular to the chassis bottom wall 11. The heads 1313 of the position posts 131 are inserted into the slots of the mounting bracket 31, and the positioning protrusions 133 are received in the recesses 3133. Then the frame 30 is slid forward along a direction substantially parallel to the chassis bottom wall 11 and the chassis front walls 13. The necks 1311 are slid in the holding portions 3132 of the slots 3130. Once the necks 1311 are blocked by the ends of the holding portions 3132, and the positioning holes 1331 of the chassis sidewalls 13 are aligned with the fastening holes 3134 of the mounting bracket 31. Two fasteners 50, such as screws or bolts, are screwed in the positioning holes 1331 and the fastening holes 3134 to secure the frame 30 to the chassis 30. The mounting bracket top wall 310 and the retaining bracket top wall 331 are substantially parallel to the chassis bottom wall 11, and substantially perpendicular to the chassis sidewalls 13.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:

a chassis comprising a chassis bottom wall and two chassis sidewalls located on the chassis bottom wall, a positioning post located on each chassis sidewall, each chassis sidewall defining a positioning hole; and a frame comprising a mounting bracket and a retaining bracket extending from the mounting bracket; the mounting bracket defining a through opening and comprising a mounting bracket top wall and two mounting bracket sidewalls connected to the mounting bracket top wall; each mounting bracket sidewall defining a slot and a fastening hole; fasteners are engaged in the positioning holes and the fastening holes, to secure the frame to the chassis; the retaining bracket defining a holding space configured for receiving a disk drive; the holding space being in communication with the through opening;

wherein when the positioning posts of the chassis are engaged in the slots of the mounting bracket, the positioning holes arc aligned with the fastening holes of the mounting bracket; each slot comprises an entrance and a holding portion communicating with the entrance; each positioning post comprises a head and a neck; the entrance is configured to allow the head to be inserted therethrough; and the holding portion is configured to receive the neck and prevent the head from being removed in a direction that is substantially perpendicular to the corresponding mounting bracket sidewall; the entrance has an extending direction substantially perpendicular to the mounting bracket top wall, and the holding portion has an extending direction substantially parallel to the mounting bracket top wall.

2. The computer enclosure of claim 1, wherein the mounting bracket sidewalls are substantially parallel to the chassis sidewalls.

3. The computer enclosure of claim 1, wherein the mounting bracket further comprises a mounting bracket front wall that is substantially perpendicular to the chassis bottom wall and the chassis sidewalls.

4. The computer enclosure of claim 1, wherein a positioning protrusion is located on each chassis sidewall; the positioning hole is defined in each positioning protrusion; a recess is located on each mounting bracket sidewall for receiving the corresponding positioning protrusion; and the fastening holes are defined in the recesses.

5. The computer enclosure of claim 1, wherein the retaining bracket comprises two retaining bracket sidewalls; and the retaining bracket sidewalls extend from two opposite sides of the mounting bracket top wall and are separated from the mounting bracket sidewalls.

6. The computer enclosure of claim 5, wherein a retaining bracket top wall extends from the mounting bracket top wall, and the retaining bracket top wall is substantially parallel to the chassis bottom wall.

7. The computer enclosure of claim 6, wherein a flange extends from each retaining bracket sidewall; and the retaining bracket top wall, the retaining bracket sidewalls and the flanges together define the holding space.

8. The computer enclosure of claim 6, wherein the retaining bracket top wall is substantially perpendicular to the retaining bracket sidewalls and substantially parallel to the chassis bottom wall.

9. A computer enclosure comprising:

a chassis comprising a chassis bottom wall and two chassis sidewalls located on the chassis bottom wall, a positioning post located on each chassis sidewall, each chassis sidewall defining a positioning hole; and a frame comprising a mounting bracket and a retaining bracket; the mounting bracket comprising a mounting bracket top wall and two mounting bracket sidewalls connected to the mounting bracket top wall; each mounting bracket sidewall defining a slot and a fastening hole; fasteners are engaged in the positioning holes and the fastening holes to secure the frame to the chassis; the retaining bracket is configured for receiving a disk drive and comprising a retaining bracket top wall extending from the mounting bracket top wall;

wherein when the positioning posts of the chassis are engaged in the slots of the mounting bracket, the positioning holes are aligned with the fastening holes of the mounting bracket; each slot comprises an entrance and a holding portion communicating with the entrance; each positioning post comprises a head and a neck; the entrance is configured to allow the head to be inserted therethrough; and the holding portion is configured to receive the neck and prevent the head from being removed in a direction that is substantially perpendicular to the corresponding mounting bracket sidewall; the entrance has an extending direction substantially perpendicular to the mounting bracket top wall, and the holding portion has an extending direction substantially parallel to the mounting bracket top wall.

10. The computer enclosure of claim 9, wherein the mounting bracket sidewalls are substantially parallel to the chassis sidewalls.

11. The computer enclosure of claim 9, wherein the mounting bracket further comprises a mounting bracket front wall that is substantially perpendicular to the chassis bottom wall and the chassis sidewalls.

12. The computer enclosure of claim 11, wherein the mounting bracket front wall defines a through opening; the retaining bracket defines a holding space for receiving the disk drive; and the through opening is in communication with the holding space.

13. The computer enclosure of claim 12, wherein the retaining bracket further comprises two retaining bracket sidewalls connected to the retaining bracket top wall; and the retaining bracket sidewalls extend from two opposite sides of the mounting bracket top wall and are separated from the mounting bracket sidewalls.

14. The computer enclosure of claim 13, wherein the retaining bracket sidewalls are substantially perpendicular to the retaining bracket top wall; and the retaining bracket top wall is substantially parallel to the chassis bottom wall.

15. The computer enclosure of claim 14, wherein a flange extends from each retaining bracket sidewall; and the retaining bracket top wall, the retaining bracket sidewalls and the flanges together define the holding space.

16. The computer enclosure of claim 9, wherein a positioning protrusion is located on each chassis sidewall; the positioning hole is defined in each positioning protrusion; a recess is located on each mounting bracket sidewall for receiving the corresponding positioning protrusion; and the fastening holes are defined in the recesses.

* * * * *